LE ROY S. STARRETT.
Meat Cutter.
No. 47,875.  Patented May 23, 1865.
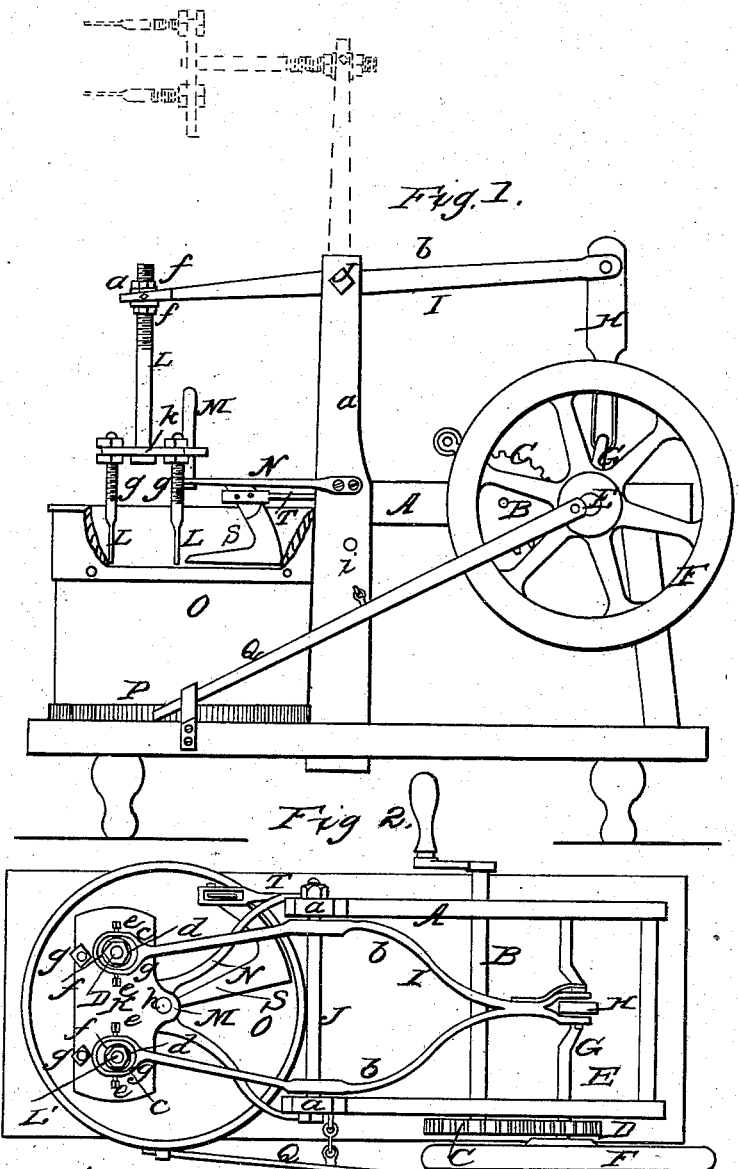

UNITED STATES PATENT OFFICE.

LE ROY S. STARRETT, OF NEWBURYPORT, MASSACHUSETTS.

IMPROVED MEAT-CUTTER.

Specification forming part of Letters Patent No. 47,875, dated May 23, 1865.

*To all whom it may concern:*

Be it known that I, LE ROY S. STARRETT, of Newburyport, in the county of Essex and State of Massachusetts, have invented a new and Improved Meat-Cutting Device; and I do hereby declare that the following is a full, clear, and exact description thereof, which will enable others skilled in the art to make and use the same, reference being had to the accompanying drawings, forming part of this specification, in which—

Figure 1 is a side view of my invention, partly in section; Fig. 2, a plan or top view of the same.

Similar letters of reference indicate like parts.

This invention relates to a new and improved device for cutting meat for sausages, pies, &c., designed for the use of butchers on a large scale, as well as for family use on a small scale.

The invention consists in the employment or use of reciprocating knives, arranged and operated in a novel way, in connection with a rotating bed, whereby a very desirable machine for the purpose intended is obtained.

A represents a framing, which may be constructed in any suitable manner to support the working parts of the machine, and B is a driving-shaft placed transversely on the framing, and having a toothed wheel, C, at one end of it, which gears into a pinion, D, on a shaft, E, parallel with B, the shaft E having a fly-wheel, F, at one end of it, and a crank, G, upon it, which crank is connected by a rod, H, with one end of a walking-beam, I, the shaft J of which passes through two uprights, $a$ $a$, of the framing. The walking-beam I is of forked or double form—that is to say, composed of two bars, $b$ $b$, uniting at the pitman or connecting-rod end, and diverging from each other a certain distance and then extending parallelly, or nearly so, forward to the opposite end, which consequently has two termini, each of which is a loop or eye, $c$, to receive a collar, $d$. These collars $d$ are secured in the eyes $c$ by bolts $e$ at opposite sides, as shown in Fig. 2, to admit of the collars being retained in a vertical position under the movement of the walking-beam.

K is a horizontal plate, which has two vertical rods, L′ L′, attached to it, extending upward through the collars $d$ $d$ and secured therein by jam-nuts $ff$. The plate K is provided with four pendent rods, $g$—two being near each end—and to these rods knives L L are secured, said knives being parallel with each other. The plate K has an eye or hole, $h$, in it at its inner edge, through which an upright guide-rod, M, passes, said guide-rod being at the outer ends of arms N, which are attached to the framing A.

O represents a bed, which works or rotates on a pivot at its lower end. This bed is provided at its lower end with a rack, P, which extends all around it and into which a pawl, Q, works, said pawl being operated by being attached to the hub of the fly-wheel F at a suitable distance from its center, as shown in Fig. 1. By this means a rotary motion is given to the bed O. The knives L L extend entirely across the upper surface of the bed O, one knife being at the center of the bed and the other about midway between the center and its periphery. The bed O has a rim or slide, R, attached to its upper end and extending all around it, said rim projecting upward a suitable distance to form a disk to retain the meat or substance to be cut on the bed.

S is a scraper, which extends from the edge to the center of the bed and is attached to an arm, T, of the framing A. This scraper serves to stir the meat on the bed O, scrape it up from the bottom, and cause the whole mass to be acted upon equally by the knives.

From the above description it will be seen that by turning the shaft B an up-and-down movement will be communicated to the knives L L and a rotary movement to the bed O, and the meat will be cut or chopped. The bed is moved or turned at each upward movement of the knives, the meat being cut at the downward movement of the same.

In order to facilitate the removal of the meat from the bed O and the placing of it thereon the rod H is detached from the walking-beam and the latter turned or adjusted in a vertical position, as shown in red in Fig. 1, so that the knives will be elevated above the bed, the walking-beam being retained in this position by means of a rod or bolt, $i$.

The whole arrangement is extremely simple and efficient.

The device has been practically tested, and it performs its work rapidly and well.

Having thus described my invention, I claim as new and desire to secure by Letters Patent—

1. The combination of the walking-beam I, pitman H, crank-shaft E G, pawl Q, rack P', and rotary bed O, arranged and operating as specified.

2. The combination of the horizontal plate K, pendent rods $g$, knives L, rods L' L', and guide-rod M, constructed and arranged in the manner and for the purposes described.

LE ROY S. STARRETT.

Witnesses:
HENRY A. BARTLETT,
I. MOULTON.